United States Patent
Okahata et al.

(10) Patent No.: US 7,906,732 B2
(45) Date of Patent: Mar. 15, 2011

(54) METHOD FOR PRODUCING A GLASS PLATE WITH A CONDUCTIVE PRINTED WIRE AND GLASS PLATE WITH A CONDUCTIVE PRINTED WIRE

(75) Inventors: Naoki Okahata, Tokyo (JP); Satoshi Kashiwabara, Tokyo (JP); Kazuo Sunahara, Tokyo (JP); Tomoaki Okada, Hiroshima (JP); Katsuhiko Takeda, Hiroshima (JP)

(73) Assignee: Asahi Glass Company, Limited, Tokyo (JP)

( * ) Notice: Subject to any disclaimer, the term of this patent is extended or adjusted under 35 U.S.C. 154(b) by 295 days.

(21) Appl. No.: 12/324,985

(22) Filed: Nov. 28, 2008

(65) Prior Publication Data

US 2009/0095512 A1  Apr. 16, 2009

Related U.S. Application Data

(63) Continuation of application No. PCT/JP2007/061002, filed on May 30, 2006.

(30) Foreign Application Priority Data

May 30, 2006 (JP) ................................ 2006-150072

(51) Int. Cl.
  *H05K 1/09* (2006.01)
(52) U.S. Cl. ......... 174/257; 174/250; 174/261; 174/255; 174/256; 361/751; 361/750; 361/746
(58) Field of Classification Search .................. 361/748, 361/750, 751, 749, 746, 795, 739, 757, 679.01, 361/728, 762; 174/250, 253, 255, 256, 257, 174/261, 268; 29/850, 829, 825, 611; 430/97, 430/125.3, 45.1–45.3, 49.31, 110.4, 110.1, 111.4; 427/96.8, 509; 219/19, 203, 522, 543, 548, 528; 428/34, 174
See application file for complete search history.

(56) References Cited

U.S. PATENT DOCUMENTS

| 4,703,288 | A | * | 10/1987 | Frye et al. | .......................... 333/1 |
| 6,396,026 | B2 | * | 5/2002 | Gillner et al. | ................. 219/203 |
| 2002/0048630 | A1 | * | 4/2002 | Nakata et al. | ................... 427/96 |
| 2002/0083858 | A1 | * | 7/2002 | MacDiarmid et al. | ........ 101/484 |
| 2003/0007332 | A1 | * | 1/2003 | Seki et al. | ..................... 361/750 |

(Continued)

FOREIGN PATENT DOCUMENTS

JP   62-184469 A   8/1987

(Continued)

*Primary Examiner* — Dameon E Levi
*Assistant Examiner* — Hoa C Nguyen
(74) *Attorney, Agent, or Firm* — Oblon, Spivak, McClelland, Maier & Neustadt, L.L.P.

(57) ABSTRACT

Provided is a process for producing a glass plate with a conductive printed wire, which does not require a screen plate for each model, facilitates adjustments for desired heat generation performance or antenna performance, has an excellent adhesion to a glass plate surface, and minimizes surface roughness.

The process for producing a glass plate with a conductive printed wire is characterized in that a laminate comprising a layer obtained by electro printing a first conductive toner having a number standard average particle size ($D_{50}$) of 10 $\mu m < D_{50} \leq 50$ $\mu m$ and a layer obtained by electro printing a second conductive toner having a particle size ($D_{50}$) of 5 $\mu m \leq D_{50} \leq 10$ $\mu m$ is formed on a surface of a glass plate and the glass plate is heated to fire the toners to thereby form a conductive printed wire having a predetermined pattern on the surface of the glass plate.

7 Claims, 1 Drawing Sheet

U.S. PATENT DOCUMENTS

| | | | |
|---|---|---|---|
| 2003/0213614 A1* | 11/2003 | Furusawa et al. | 174/256 |
| 2005/0161250 A1* | 7/2005 | Hiramoto | 174/250 |
| 2005/0224254 A1* | 10/2005 | Endoh et al. | 174/257 |
| 2006/0186104 A1* | 8/2006 | Winter | 219/203 |
| 2007/0077509 A1 | 4/2007 | Okahata et al. | |
| 2007/0104887 A1 | 5/2007 | Kashiwabara et al. | |
| 2007/0154829 A1 | 7/2007 | Kashiwabara et al. | |
| 2007/0160922 A1 | 7/2007 | Kashiwabara et al. | |
| 2008/0254268 A1 | 10/2008 | Okahata et al. | |
| 2009/0133901 A1* | 5/2009 | Karashima et al. | 174/250 |

FOREIGN PATENT DOCUMENTS

| | | |
|---|---|---|
| JP | 2002-244337 A | 8/2002 |
| JP | 2003-188622 | 7/2003 |
| WO | WO 2006/006492 A1 | 1/2006 |

* cited by examiner

METHOD FOR PRODUCING A GLASS PLATE WITH A CONDUCTIVE PRINTED WIRE AND GLASS PLATE WITH A CONDUCTIVE PRINTED WIRE

TECHNICAL FIELD

The present invention relates to a process for producing a glass plate with a conductive printed wire and a glass plate with a conductive printed wire, particularly, it relates to a process for producing a conductive printed wire on a surface of a glass plate in the form of film (line thickness of at least 20 μm), the printed wire having excellent adhesion to the surface of a glass plate usable for a window of an automobile or the like.

BACKGROUND ART

A glass plate to be used for a window of an automobile, is provided with a conductive printed wire as a heater wire for defogging or as an antenna wire for receiving radio, television or the like. Such conductive printed wire is provided mainly on a rear window or on a rear side window of an automobile. The conductive printed wire consists mainly of a fired product of a paste containing silver. Specifically, a paste having silver, glass frit, a binder resin and so on is printed on a glass plate surface in a predetermined pattern by screen printing and then the glass plate is heated to decompose the resin content of the binder and to fix silver on the glass plate by the glass frit, followed by firing silver to form a conductive printed wire on the glass plate surface.

There is a restriction to the voltage in the electrical system to be used for an automobile, and in order to obtain a desired heat generation, it is necessary to set the resistance of the heater wire at a prescribed level. Further, in order to receive radio waves by a prescribed antenna pattern, it is necessary to set the resistance of the antenna wire at a prescribed level. The resistance of the conductive printed wire depends on the line width or line thickness (layer thickness), and the thinner the line width or the line thickness is, the higher the resistance is.

On the other hand, in order to sufficiently remove defogging or to receive radio waves with a desired sensitivity over the entire region of the window, it is necessary to contrive a pattern for heater wires or antenna wires. By a computer simulation, it is possible to predict to some extent how much fogging can be removed or what grade of antenna performance can be obtained by such a pattern. Further, it has been proposed to simply adhere a conductive tape on a glass plate surface to preliminarily measure various performances (see, e.g. Patent Document 1). However, in order to obtain the final judgment as to desired heat generation performance and antenna performance, it is necessary to actually provide a conductive printed wire and measure the respective performances.

Accordingly, there may be a case that even after a screen has been prepared according to almost the final decision and a glass plate with a conductive printed wire has been produced with the screen, the pattern of the conductive printed wire has to be changed. In such a case, the screen has to be modified to meet the modified pattern.

Automobiles are mass production products, and likewise window glass plates to be used for automobiles are mass production products. Accordingly, once a pattern is determined for conductive printed wires, it is required that a conductive paste is sequentially printed on a large quantity of glass plates in the predetermined pattern. In such mass production, screen printing of a conductive paste by means of a screen is suitable. However, as mentioned above, even if a screen having a pattern substantially determined is prepared, it will be necessary to modify the screen to have the pattern adjusted to make the heat generation performance or antenna performance to be finally desired. In addition, in a case that the glass plates are to be used for windows of automobiles, the shapes of the glass plates, the shapes of patterns of conductive printed wires etc. may vary depending upon the types of automobiles. Accordingly, depending upon the types of automobiles, screens will have to be prepared, and many screens will have to be stocked. Thus, it is desired to develop a process for producing glass plates with conductive printed wires, whereby no modification of a screen is required.

In a case that a conductive printed wire is to be provided on a window of an automobile, it is required to make the line width thin as possible to secure a good view, and accordingly, it is necessary to form a conductive printed wire whose resistance is as low as possible even when the line width is smaller. For this, attempts have been made to reduce the resistance of a conductive printed wire by making the line thickness larger in the form of thick film. For example, in recent years, there have been proposed various methods to print a toner (ink) comprising conductive fine particles made of metal such as silver and a thermoplastic resin on an inorganic substance by an electro printing method, followed by firing to form a pattern of conductive wires, and to increase the thickness of a printed wire in the form of thick film by controlling conditions of printing. However, when a toner layer was formed in the form of thick film (having a line thickness of at least 20 μm) by these methods, there was a problem that difference in thermal conductivity in a thickness direction, produced at the time of firing is not negligible, so that adhesion between the conductive printed wire and the inorganic substance after firing might be insufficient. In addition, there was a danger that cracks might result in the conductive printed wires by firing, and the electric performance (resistance) of the formed pattern deteriorated largely. On the other hand, in a case that the thickness of a conductive printed wire is to be increased in the form of thick film, the particle size of conductive fine particles will generally be increased. However, the larger the particle size of the conductive fine particles is, the larger the roughness of the line width of the conductive printed wire is, and accordingly, there was a problem that it was difficult to obtain a conductive printed wire of stable resistance. Therefore, it was very difficult to produce a conductive printed wire in the form of thick film, which is usable sufficiently as a pattern of wire and which has a stable electric performance.

Patent Document 1: JP-A-2003-188622 (Claims)

DISCLOSURE OF THE INVENTION

Objects to be Accomplished by the Invention

The purpose of the present invention is to provide a process for producing a conductive printed wire on the surface of a glass plate with good adhesion, the conductive printed wire having excellent electric performance and being low in the degree of roughness of the line width even when the wire is formed in the form of thick film.

Means to Accomplish the Object

In accordance with the present invention, there is provided a process for producing a glass plate with a conductive printed wire, characterized by providing on a surface of a glass plate a laminate comprising a first conductive toner layer as described below and a second conductive toner layer as described below, and heating the glass plate to fire the toners whereby a conductive printed wire having a predetermined pattern is provided on the surface of the glass plate:

the first conductive toner layer: a layer obtained by electro printing a first conductive toner having a number standard average particle size ($D_{50}$) of 10 µm<$D_{50}$≦50 µm.

the second conductive toner layer: a layer obtained by electro printing a second conductive toner having a number standard average particle size ($D_{50}$) of 5 µm≦$D_{50}$≦10 µm.

Further, in accordance with the present invention, there is provided a glass plate with a conductive printed wire having a predetermined pattern on a surface of a glass plate, characterized in that the wire thickness of the conductive printed wire is from 5 to 30 µm, the specific resistance is not more than 5 µΩ·cm and the roughness of the line width of the conductive printed wire is not more than 0.5 µm wherein the roughness of the line width represents the absolute value of a difference between the line width and the standard width where the standard width is the line width of a conductive printed wire at the intersection of a feeding point or a bus bar formed at a peripheral portion of the glass plate with the conductive printed wire.

EFFECTS OF THE INVENTION

According to the present invention, it is possible to form a conductive printed wire on a surface of a glass plate with good adhesion, the conductive printed wire being excellent in electrical performance and being small in roughness of the line width even when it is in the form of thick film. Accordingly, it is possible to form easily a conductive printed wire having desired heat generation performance or antenna performance on a surface of a glass plate.

MEANINGS OF SYMBOLS

Figure 1:
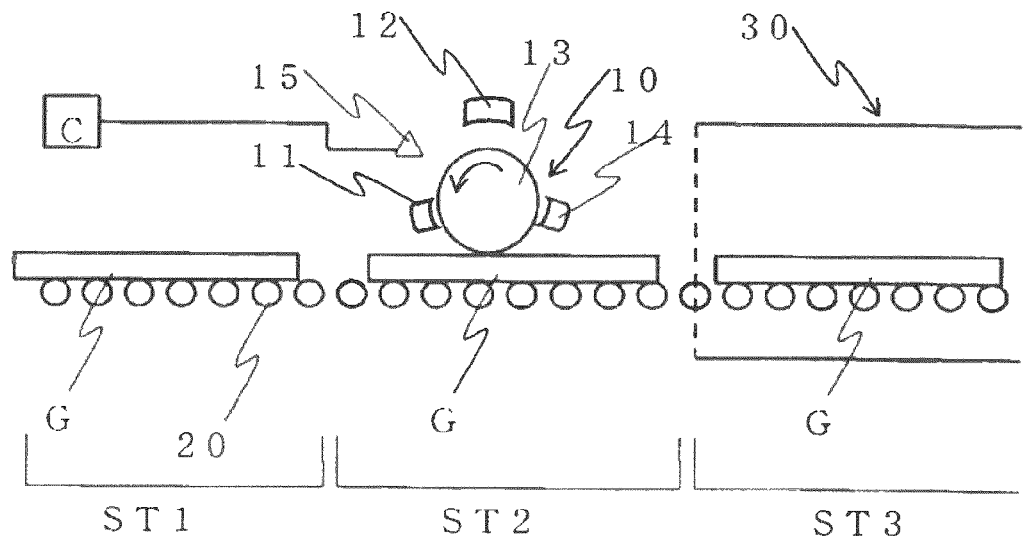
FIG. 1 is a schematic side view illustrating an example of an continuous process for producing a glass plate with a conductive printed wire of the present invention.

1: Defogger
2: Antenna wire
3: Bus bar
4: Dark colored ceramic fired product
10: Electro printing apparatus
11: Developing device
12: Electrification device
13: Photoconductor drum
14: Static eliminator
15: Light source
20: Conveyer roll
30: Heating furnace
G: Glass plate
C: Computer
ST1: Chamfering step
ST2: Printing step
ST3: Firing step
ST4: Inspection step

BEST MODE FOR CARRYING OUT THE INVENTION

Now, an embodiment of the present invention will be described with reference to the drawings.

FIG. 1 is a schematic side view illustrating an example of a continuous process for producing a glass plate with a conductive printed wire of the present invention. The glass plate G is transported to a printing step via a step (ST1) of cutting into a predetermined shape, chamfering, cleaning, etc. In the printing step ST2, a toner containing conductive fine particles (hereinbelow, referred to as the conductive toner) is printed in a predetermined pattern on a surface of the glass plate G by an electro printing apparatus 10. The glass plate G having the toner printed in a prescribed pattern is transported to a firing step. In the firing step ST3, the glass plate G is heated to a predetermined temperature by a heating furnace 30, and the toner is fired to the surface of the glass plate G, whereby a glass plate having a conductive printed wire of predetermined pattern is prepared. The formed conductive printed wire is transported to an inspection step (ST4, not shown) at which inspection of the resistance value is carried out. The result of the inspection in the inspection step ST4 is transmitted to a computer C in which judgment as to whether or not the desired heat generation performance or antenna performance is obtainable, is carried out and it is converted to information for adjustment to a predetermined pattern or a line width of toner, which is utilized for the control of pattern-printing in the printing step ST2.

In the step ST1, a rectangular glass plate is cut into a predetermined shape, and the cut surface is chamfered. Then, the glass plate is cleaned and, if necessary, preheated and transported to the printing step ST2 by conveyer rolls 20.

In the printing step ST2, a photoconductor drum 13 is subjected to removal of electricity by a static eliminator 14 while the photoconductor drum 13 is rotated. Then, the photoconductor drum 13 is charged by an electrification device 12 and irradiated with exposure light from a light source 15 to have the photoconductor drum 13 exposed with a predetermined pattern. Then, the exposed surface of the photoconductor drum 13 is rotated to a developing device 11 for presenting a toner to the photoconductor drum 13, whereby a toner layer is formed in a predetermined pattern on the surface of the photoconductor drum 13. In this case, the toner is stirred and mixed with a carrier in the developing device 11, and it is transported by the carrier to be supplied to the photoconductor drum 13. The toner layer in the predetermined pattern on the surface of the photoconductor drum 13 is transferred to the surface of a glass plate G transported with the rotation of the photoconductor drum 13. Thus, a toner layer of a predetermined pattern is formed on the surface of the glass plate G. At that time, a secondary transfer plate such as an intermediate belt may be interposed between the photoconductor drum 13 and the surface of the glass plate G.

In the computer C, a pattern information is stored so that exposure light is irradiated to carry out exposure in a predetermined pattern. Accordingly, by an instruction from the computer C, the exposure light from the light source 15 is irradiated in a predetermined pattern. In a case that the glass plate G is to be used for a window of automobile, the shape of the glass plate, the pattern shape of the conductive printed wire, etc. vary depending on the type of the automobile. Accordingly, on the basis of such data corresponding to the type of automobile, the instruction signal may be changed, whereby it is possible to easily change from the production of a glass plate of a certain type to the production of a glass plate of another type.

The glass plate G having a toner layer of a predetermined pattern, is transported into a heating furnace 30 and heated at a predetermined temperature, usually from about 600 to 740° C. The toner is thereby fired on the surface of the glass plate G, whereby a conductive printed wire of a predetermined pattern is formed on the glass plate. Usually, a glass plate for a window of an automobile is curved. Accordingly, when the glass plate with a conductive printed wire prepared as described above, is to be used for a window of an automobile, it is heated at the firing step ST3 and is subjected to a tempering treatment via a bending process. Here, there may be a case that instead of the tempering treatment, an annealing treatment may be carried out (bending of the glass plate for laminated glass).

In the process for producing a glass plate of the present invention (herein-below, referred to as the process of production), the number standard average particle size $D_{50}$ of the first conductive toner is to be in a range of 10 μm<$D_{50}$≦50 μm, preferably 20 μm<$D_{50}$≦35 μm, and the number standard average particle size $D_{50}$ of the second conductive toner is to be in a range of 5 μm≦$D_{50}$≦10 μm, preferably 5 μm<$D_{50}$≦8 μm. When $D_{50}$ of the first conductive toner is to be in the range of 10 μm<$D_{50}$≦50 μm, it is possible to reduce effectively the resistance of the conductive printed wire. Further, when $D_{50}$ of the second conductive toner is to be in the range of 5 μm≦$D_{50}$≦10 μm, rough portions in the line width of the first conductive toner layer, even if they take place much, would be buried with the second conductive toner having a smaller particle size whereby the production of the rough portions could be suppressed.

In the process of production, it is preferred when the layer thickness of the first conductive toner layer is from 20 to 80 μm, preferably from 20 to 60 μm, and the layer thickness of the second conductive toner layer is from 5 to 20 μm, preferably from 5 to 10 μm. When the layer thickness of the first conductive toner layer is from 20 to 80 μm, the resistance of the conductive printed wire can effectively be reduced. On the other hand, when the layer thickness of the second conductive toner layer is from 5 to 20 μm, a preferred conductive printed wire having uniform line width and line thickness and having a stable electric performance can easily be obtained.

In the process of production, the first conductive toner layer in the laminate may be provided at a side of the surface of a glass plate, or the second conductive toner layer may be provided at a side of the surface of a glass plate. In a case of providing the first conductive toner layer at a side of the glass plate surface, rough portions of the line width produced by using the first conductive toner having larger particle size can effectively be buried with the second conductive toner having a smaller particle size whereby the production of rough portions can effectively be controlled. On the other hand, in a case of providing the second conductive toner layer at a side of the glass plate surface, the first conductive toner layer is formed on the second conductive toner layer having an excellent smoothness whereby a preferred conductive printed wire having an excellent smoothness as laminate in its entirety and having a stable electric performance can easily be obtained. In this case, since the first conductive toner layer adjoins the second conductive toner layer to form a laminate, a conductive printed wire excellent in electric performance and free from rough line width can easily be obtained. Here, when the layer thickness of the laminate is from 25 to 70 μm, it is preferred that a conductive printed wire having a low resistance and having a stable electric performance can easily be obtained.

In the process of production, the first conductive toner layer and the second conductive toner layer may be laminated in any stage from the supply of the conductive toner via the developing device 11 to the transfer to a surface of a glass plate G. In the following, concrete examples A) to C) will be described.

A) On the photoconductor drum 13, a first conductive toner layer and a second conductive toner layer are formed to form a laminate and the laminate is transferred onto a surface of a glass plate G (a lamination on the photoconductor drum 13). In employing A), the first conductive toner layer and the second conductive toner layer can be transferred from the photoconductor drum 13 to the surface of the glass plate G in one process and accordingly, it provides a good transcriptional efficiency. Further, since the toner is fired in one thermal loading process, the deterioration of the resin by firing is avoidable and adhesion between the first and second toner layers is maintained well.

B) On a transfer belt interposed between the photoconductor drum 13 and a surface of a glass plate G, a first conductive toner layer and a second conductive toner layer are formed to form a laminate and the laminate is transferred onto the surface of the glass plate G (a lamination on the transfer belt). In employing B), the first conductive toner layer and the second conductive toner layer can be transferred from the transfer belt to the surface of the glass plate G in one process and accordingly, it provides a good transcriptional efficiency. Further, since the toner is fired in one thermal loading process, the deterioration of the resin by firing is avoidable and the adhesion between the first and second toner layers is maintained well.

C) On a surface of a glass plate G, a first conductive toner layer and a second conductive toner layer are formed directly to form a laminate (a lamination on the surface of the glass plate G). In employing C), it is unlikely that a reduction of picture quality by transferring takes place, whereby a conductive printed wire having a low resistance and less roughness can easily be obtained. Further, since the process of forming the toner layers on the surface of the glass plate G followed by firing them is repeated twice, the toner layer formed at the side of the surface of the glass plate G (herein-below, referred to as the first layer) in the laminate is heated sufficiently whereby the grade of leveling at the interface between the first layer and the glass plate G can be improved greatly. Further, since the toner layer formed on the first layer (herein-below, referred to as the second layer) is formed on the first layer of substantially the same material, the affinity for the first layer is good and the transfer rate can be increased, so that adhesion among adjacent layers on the surface of the glass plate G, the first layer and the second layer is maintained well.

It is preferred that the first conductive toner and the second conductive toner contain respectively conductive fine particles, a thermoplastic resin and glass frit. In this case, before firing, the conductive toner is fixed on the surface of the glass plate due to the adhesion of the thermoplastic resin. In the subsequent heating process, the thermoplastic resin in the conductive toner decomposes first, and the decomposed thermoplastic resin evaporates from the glass plate by heat, and disappears. After the major portion of the thermoplastic resin has evaporated, the glass frit starts melting and the conductive toner is fixed onto the surface of the glass plate due to the adhesion of the glass frit. During the process until the glass frit melts completely, the thermoplastic resin decomposes and evaporates completely whereby the residual volume of resin in a conductive printed wire after firing can be reduced. Finally, the glass plate is heated to a temperature exceeding 600C. Then, the conductive fine particles would join by firing and the molten glass frit would bury gaps between the fired conductive fine particles for leveling. Then, when the molten glass frit solidifies, a conductive printed wire consisting of the joined conductive fine particles and a glass content burring gaps between the fine particles will be obtained.

Other than the above-mentioned components, conductive toner particles may contain an inorganic pigment such as black iron oxide, cobalt blue or iron oxide red, an azo-type metal-containing dye, a salicylic acid-type metal-containing dye, or a charge-controlling agent such as a quaternary ammonium salt as the case requires.

The conductive toner is produced, for example, by mixing a thermoplastic resin, conductive fine particles and glass frit, etc., followed by kneading and cooling to prepare pellets, which are then pulverized and classified. The heating temperature at the time of kneading is preferably from 150 to 200° C. When the heating temperature is at least 150° C., mixing of the thermoplastic resin, the conductive fine particles and the glass frit etc. can be carried out uniformly. On the other hand, when the heating temperature is at most 200° C., decomposition of the thermoplastic resin can be avoided.

The conductive toner thus obtained is printed on a surface of a glass plate by electro printing and then fired to form a conductive printed wire. The firing temperature is preferably from 600 to 740° C. When the firing temperature is at least 600° C., the conductive fine particles will be sufficiently sintered to one another. On the other hand, when the firing temperature is at most 740° C., deformation of the glass plate can be avoided. In the present invention, as the glass plate, soda lime glass, alkali-free glass or quartz glass, for example, is used.

In the glass plate with a conductive printed wire of the present invention, the line thickness of the conductive printed wire is from 5 to 30 μm, the specific resistance is at most 5 μΩ·cm and the roughness of the line width of the conductive printed wire is at most 0.5 μm.

When the line thickness of the conductive printed wire is at least 5 μm, the resistance of the conductive printed wire can be suppressed to be low. On the other hand, when the line thickness is at most 30 μm, adhesion between the conductive printed wire and the surface of the glass plate can be maintained while the resistance of the conductive printed wire is suppressed to be low. Preferably, the line thickness of the conductive printed wire is from 7 to 20 μm, more preferably from 10 to 20 μm.

Further, when the specific resistance of the conductive printed wire is at most 5 μΩ·cm, the resistance of the conductive printed wire can be suppressed to be low. Preferably, the specific resistance of the conductive printed wire should be at most 3 μΩ·cm.

Further, when the roughness of the line width of the conductive printed wire is at most 0.5 μm, the resistance of the conductive printed wire can be suppressed to be low. Preferably, the roughness of the line width of the conductive printed wire should be at most 0.1 μm, more preferably at most 0.05 μm.

Figure 2:
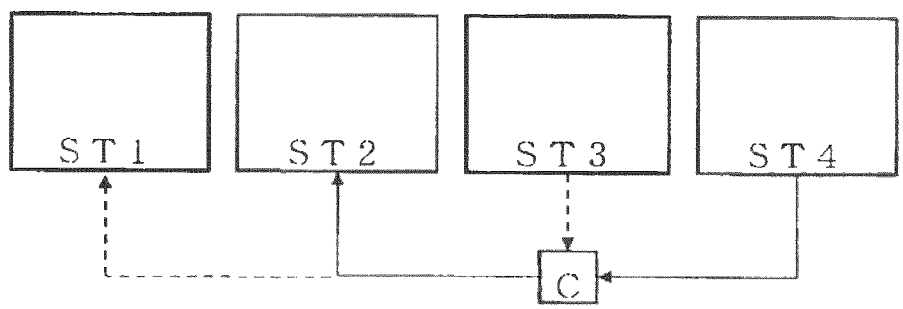
FIG. 2 is a schematic view illustrating a control process relating to a preferred embodiment of the present invention.

FIG. 2 is a schematic view illustrating a control process relating to a preferred embodiment of the present invention. On a glass plate pre-treated at ST1, a toner is printed in a predetermined pattern at the printing step ST2, and at the firing step ST3, the toner is fired by heating to produce a glass plate with a conductive printed wire. At the inspection step ST4 after the firing step ST3, the resistance of the conductive printed wire is measured. The data of the measured resistance are sent to a computer C for controlling the pattern of the toner at the printing step. If necessary, the temperature data at the firing step ST3 are also sent to the computer C. The data sent to the computer C are utilized as data to judge whether or not the desired heat generation performance or antenna performance is obtained. If it is judged that the desired performance is not obtained, by calculation by the computer C, the line width of the toner to be printed or the printing pattern itself is adjusted so as to obtain the desired performance. The adjusted line width or printing pattern is fed back to the printing step ST2 to form a conductive printed wire on the next glass plate.

When the desired heat generation performance or antenna performance can be obtained by such feeding back, it is possible to produce glass plates with conductive printed wires in a large quantity by fixing the control data.

In a case that the glass plate G is used for a window of an automobile, the data of the shapes of the glass plates depending on the types of automobiles and the data of the patterns for conductive printed wires may be stored and accumulated in the computer C, so that in the production of a glass plate for a certain type, an instruction based on the data relating to the pattern for a conductive printed wire corresponding to that type is transmitted to the electroprinter, whereby a change from one type to another can easily be carried out, and printing depending on each type can be carried out. Further, an instruction based on the data of the shape of the glass plate among data relating to various types, is transmitted to the cutting and chamfering step (ST1) for a glass plate, whereby a change from one type to another can easily be carried out, and cutting and chamfering according to each type can be carried out.

Figure 3:
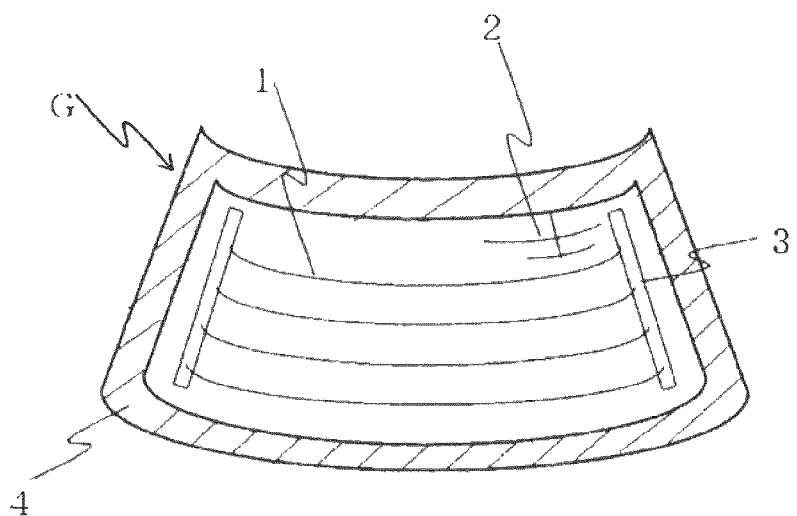
FIG. 3 is a front view illustrating an example of a rear window of automobile.

In a rear window of an automobile illustrated in FIG. 3 as an example, conductive printed wires (defoggers 1, antenna wires 2 and bus bars 3) are provided in the center region of the glass plate G, and a dark colored ceramic fired product 4 is provided in its peripheral region. According to the present invention, such conductive printed wires can be printed on a surface of a glass plate by the process of production suitable for a large quantity production.

INDUSTRIAL APPLICABILITY

According to the present invention, a conductive printed wire of high image quality and less fogging can be printed on a surface of a glass plate with good adhesion. Accordingly, the present invention is usable for process for producing a glass plate with a conductive printed wire (a defogger wire and an antenna wire or the like) of, in particular, an automobile.

The entire disclosure of Japanese Patent Application No. 2006-150072 filed on May 30, 2006 including specification, claims, drawings and summary is incorporated herein by reference in its entirety.

What is claimed is:

1. A glass plate with a conductive printed wire having a predetermined pattern, provided on a surface of a glass plate, characterized in that the wire thickness of the conductive printed wire is from 5 to 30 μm, the specific resistance is not more than 5 μΩ·cm and the roughness of the line width of the conductive printed wire is not more than 0.5 μm wherein the roughness of the line width represents the absolute value of a difference between the line width and the standard width where the standard width is the line width of a conductive printed wire at the intersection of a feeding point or a bus bar formed at a peripheral portion of the glass plate with the conductive printed wire.

2. A process for producing a glass plate with a conductive printed wire, characterized by providing on a surface of a glass plate a laminate comprising a first conductive toner layer as described below and a second conductive toner layer as described below, and heating the glass plate to fire the toners whereby a conductive printed wire having a predetermined pattern is provided on the surface of the glass plate:

the first conductive toner layer: a layer obtained by electro printing a first conductive toner having a number standard average particle size ($D_{50}$) of 10 μm<$D_{50}$≦50 μm:

the second conductive toner layer: a layer obtained by electro printing a second conductive toner having a number standard average particle size ($D_{50}$) of $5\ \mu m \leqq D_{50} \leqq 10\ \mu m$.

3. The process for producing a glass plate with a conductive printed wire according to claim 2, wherein the layer thickness of the first conductive toner layer is from 20 to 80 μm and the layer thickness of the second conductive toner layer is from 5 to 20 μm.

4. The process for producing a glass plate with a conductive printed wire according to claim 2, wherein the first conductive toner layer in the laminate is provided at a side of the surface of the glass plate.

5. The process for producing a glass plate with a conductive printed wire according to claim 2, wherein the second conductive toner layer in the laminate is provided at a side of the surface of the glass plate.

6. The process for producing a glass plate with a conductive printed wire according to claim 2, wherein the laminate is formed on a photoconductor drum and then the laminate is transferred on the surface of the glass plate.

7. The process for producing a glass plate with a conductive printed wire according to claim 2, wherein the laminate is formed on a transfer belt interposed between a photoconductor belt and the surface of the glass plate and then the laminate is transferred on the surface of the glass plate.

* * * * *